(12) United States Patent
Jialanella et al.

(10) Patent No.: US 8,729,168 B2
(45) Date of Patent: May 20, 2014

(54) VEHICULAR GLASS ADHESIVE AND METHOD OF ADHERING SAID GLASS

(75) Inventors: Gary L. Jialanella, Oxford, MI (US); Christopher P. Christenson, Seguin, TX (US); Valeriy V. Ginzburg, Midland, MI (US); Toni Ristoski, Shelby Township, MI (US); Eric E. Cole, Grand Blanc, MI (US); Sean C. Tobin, Livonia, MI (US); Lirong Zhou, Rochester Hills, MI (US)

(73) Assignee: Dow Global Technologies LLC, Midland, MI (US)

( * ) Notice: Subject to any disclaimer, the term of this patent is extended or adjusted under 35 U.S.C. 154(b) by 244 days.

(21) Appl. No.: 13/093,013

(22) Filed: Apr. 25, 2011

(65) Prior Publication Data
US 2011/0265932 A1 Nov. 3, 2011

Related U.S. Application Data

(60) Provisional application No. 61/330,148, filed on Apr. 30, 2010.

(51) Int. Cl.
*C08K 5/00* (2006.01)

(52) U.S. Cl.
USPC .......................................... 524/284; 524/261

(58) Field of Classification Search
None
See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 4,376,179 A * | 3/1983 | Agarwal et al. | 524/65 |
| 4,525,511 A | 6/1985 | Kirby et al. | |
| 4,618,656 A * | 10/1986 | Kawakubo et al. | 525/404 |
| 4,780,520 A | 10/1988 | Rizk et al. | |
| 5,747,581 A | 5/1998 | Proebster et al. | |
| 5,922,809 A | 7/1999 | Bhat et al. | |
| 5,976,305 A | 11/1999 | Bhat et al. | |
| 6,015,475 A | 1/2000 | Hsieh et al. | |
| 6,121,354 A | 9/2000 | Chronister | |
| 6,133,398 A * | 10/2000 | Bhat et al. | 528/60 |
| 6,559,213 B2 * | 5/2003 | Wesch | 524/318 |
| 6,613,816 B2 | 9/2003 | Mahdi et al. | |
| 6,709,539 B2 | 3/2004 | Zhou | |
| 2002/0100550 A1 * | 8/2002 | Mahdi et al. | 156/329 |
| 2003/0070741 A1 | 4/2003 | Rosenberg et al. | |
| 2005/0061280 A1 * | 3/2005 | Jialanella et al. | 123/90.38 |
| 2008/0185098 A1 * | 8/2008 | Wu et al. | 156/331.4 |

FOREIGN PATENT DOCUMENTS

| | | |
|---|---|---|
| EP | 1462500 A1 | 9/2004 |
| WO | 2006130592 A1 | 12/2006 |

OTHER PUBLICATIONS

Joyce, George A.; Henry, William M.; Magee, Ricky W. Advances in structure measurements of carbon black, Rubber World, Sep. 1, 2009, ISSN: 0035-9572.*
Christine Van Bellingen, Nicolas Probst, Eusebiu Grivei, Carmine Ciallella, Additives for Electical and Thermal Conductivity, BPRO meeting on Additives, Gent, Oct. 22, 2008.*
Bareiss, Determination of the Number, Weight, and z-Average Dimensions of Macromolecules by Viscosity and GPC Measurements, Makromol. Chem. 182, 1761-1774 (1981).*
Billmeyer, F.W., Jr., John Wiley and Sons, NY, NY 1984, Textbook of Polymer Science 3rd Edition, p. 206.

* cited by examiner

*Primary Examiner* — Susannah Chung
*Assistant Examiner* — Robert T Butcher
(74) *Attorney, Agent, or Firm* — Kevin J. Nilsen

(57) ABSTRACT

The invention is an adhesive composition comprising: a) an isocyanate functional polyether base prepolymers having a z molecular weight average (Mz) of about 10,000 to about 80,000 g/mole; a carbon black having an average oil absorption number of at least about 80 to at most about 400 cubic centimeters of dibutyl phthalate per 100 grams of the carbon black; (c) reactive silicon in an amount from about 0.001% to about 10% by weight of the adhesive composition; and (d) one or more catalysts for the reaction of isocyanate with hydroxyl groups. The adhesive compositions of the invention surprisingly may have improved sag performance (i.e., decreased sag) when heated, while also making them more easily pumped.

19 Claims, 2 Drawing Sheets

VEHICULAR GLASS ADHESIVE AND METHOD OF ADHERING SAID GLASS

CROSS REFERENCE STATEMENT

This application claims the benefit of U.S. Provisional Application No. 61/330,148, filed Apr. 30, 2010, which is incorporated herein by reference.

FIELD OF INVENTION

The invention relates to an adhesive which is useful in bonding glass into vehicles and buildings.

BACKGROUND OF INVENTION

Adhesive compositions are used to affix (bond) glass (windows) into buildings and vehicles, see Rizk, U.S. Pat. No. 4,780,520; Bhat, U.S. Pat. No. 5,976,305; Hsieh et al, U.S. Pat. No. 6,015,475 and Zhou, U.S. Pat. No. 6,709,539, all incorporated herein by reference. In automobile factories, windows are installed using robots and computer controlled processing which facilitates the use of a variety of high performance adhesives, for instance, nonconductive adhesives and high modulus adhesives. These adhesives have to be storage stable and be readily applied under high shear, for example, to a windshield, while retaining the bead shape so that the windshield can be properly fitted to the automobile. This typically has been achieved by one part moisture curable polyurethane prepolymer based adhesives having fillers, with the prepolymers having sufficient molecular weight, so that they are still pumpable and can be applied to the windshield without sagging or stringing in the time it takes to place the windshield on the automobile.

The need for sufficient molecular weight of the prepolymer causes the prepolymer to have tight quality control so that it is still pumpable and yet storage stable for long periods of time. Unfortunately, these opposite characteristics make for rather narrow windows for making adhesives that do not suffer from pumping or sagging issues arising in an automated plant, particularly when the adhesive must undergo high shear from pumping, prior to being applied.

Sag is the loss of the shape of the adhesive bead, often as the result of gravitational forces. If severe enough, this deformation can interfere in the proper installation and sealing of the window into the vehicle. Stringing of an adhesive is the formation of a long string of adhesive at the end of the bead of adhesive dispensed which can complicate application of the adhesive and cause imperfections in the installed adhesive bead. Thus, a replacement window installer often has to carry a variety of adhesives so that the installer can match the adhesive to the properties of the original adhesive.

In contrast, when a vehicle needs a window replaced, it is often performed in a remote location by an installer working from a vehicle. In this environment, speed of cure is important as the vehicle owner desires to drive the vehicle as soon as possible after installation on the window. Adhesives useful in replacing windows for vehicles which facilitate fast drive away times are known; see Bhat, U.S. Pat. No. 5,976,305 and Zhou, U.S. Pat. No. 6,709,539. The introduction of various high performance adhesive compositions used for installing windows in automobile factories presents a problem for replacement window installers. First, adhesives that meet all the varied performance requirements are not available in the market place. Second, it is difficult to formulate many high performance adhesive compositions to allow rapid drive away times that do not sag or string.

Adhesives have been developed which provide good initial green strength that allows the adhesive to hold the glass in place without additional fixturing to hold the glass in place. This is achieved through the inclusion of crystalline polyesters in the adhesive. These adhesives have hot melt properties that require that the adhesive be melted and applied hot; see Proebster, U.S. Pat. No. 5,747,581, incorporated herein by reference. The problem with these adhesives is that they require heat and the use of complex equipment for their use. The initial green strength provided is not sufficient for rapid drive away time. Because of the proliferation of hot melt adhesives in the automobile window replacement market, many installers insist on heating adhesives prior to applying the adhesive to the window or the window flange. Many adhesives when heated demonstrate sagging and/or stringing.

What is needed is a composition which is useful as an adhesive for bonding glass into a structure which may be formulated to exhibit a variety of high performance properties (such as high modulus and nonconductive nature), exhibits fast safe drive away times when applied under a variety of conditions, fast strength development, can be applied without the need for heating the adhesive, but may be heated without detrimental consequences, can be applied under a wide range of environmental conditions, does not require expensive ingredients and does not sag or string when applied even after undergoing high shear just prior to being applied.

SUMMARY OF INVENTION

An aspect of the invention is an adhesive composition comprising: (a) an isocyanate functional polyether based prepolymer having a z molecular weight average (Mz) of about 10,000 to about 80,000 g/mole; (b) a carbon black having an average oil absorption number of at least about 80 to at most about 400 cubic centimeters of dibutyl phthalate per 100 grams of the carbon black; (c) reactive silicon in an amount from about 0.001% to about 10% by weight of the adhesive composition; and (d) one or more catalysts for the reaction of isocyanate with hydroxyl groups.

Another aspect of the invention is a method of bonding two or more substrates together comprising;
(i) delivering the adhesive composition of this invention to an application nozzle,
(ii) applying a bead of the adhesive composition from step (i) through the application nozzle on to at least a portion of at least one of the substrates,
(iii) contacting the substrates to be bonded and
(iv) allowing the adhesive composition to cure.

A variety of substrates may be bonded together using the composition, for instance, plastics, glass, wood, ceramics, metal, coated substrates, such as plastics with an abrasion resistant coating disposed thereon, and the like. The compositions of the invention may be used to bond similar and dissimilar substrates together. The compositions are especially useful for bonding glass or a plastic with an abrasion resistant coating disposed thereon to other substrates such as vehicles and buildings. The compositions of the invention are also useful in bonding parts of modular components together, such as vehicle modular components. The glass or plastic with an abrasion resistant coating disposed thereon can be bonded to coated and uncoated portions of vehicles.

Surprisingly, the adhesive is pumpable, sag and string resistant when bonding parts together, at temperatures between about 20° C. and about 80° C., even though the molecular weight of the prepolymer is low allowing for easy pumpability. Preferably, the composition exhibits a sag of an uncured sample of less than about 5 mm. This allows the adhesives prepared from the composition of the invention to be applied at a wide range of ambient temperatures. Heated application machinery is not necessary for the application of the adhesive, but surprisingly, the composition of this invention, has improved sag resistance upon heating above ambient conditions (~23° C.). Generally, even if the adhesive composition displays no sag at ambient temperatures, if cooled, for example, to around 0° C., the adhesive composition may display sag after being sheared to 2,000 pascals prior to applying the bead.

Furthermore, the adhesive demonstrates rapid strength development which facilitates rapid drive away times of preferably one hour, and more preferably 30 minutes, after application of the adhesive at temperatures of from about 0° F. (~18° C.) to about 115° F. (46° C.). In particular, windshields installed under such conditions meet United States Federal Motor Vehicle Safety Standard (FMVSS) 212. In some preferred embodiments, the compositions of the invention are nonconductive and demonstrate a dielectric constant of about 15 or less. The compositions of the invention typically demonstrate a modulus after application for two weeks of about 1 MPa or greater, more preferably about 2 MPa or greater and preferably about 4 MPa or less according to ASTM D4065 measured at 25° C. This modulus is desirable because it allows for a compliant enough adhesive to absorb the vibrations and shock experienced by a windshield in an automobile and still has the strength to adhere the windshield in the automobile.

DETAILED DESCRIPTION OF INVENTION

Figure 1:
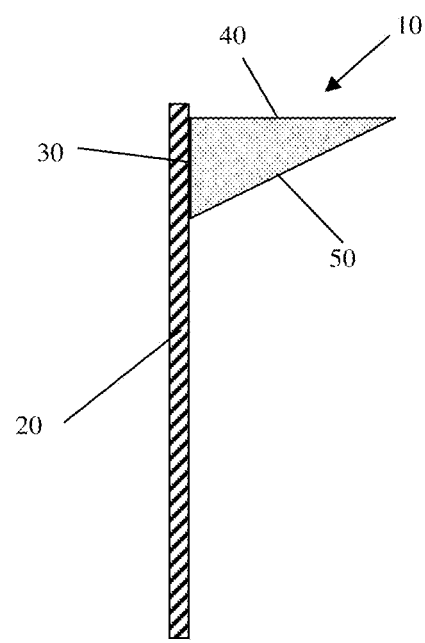
FIG. 1 is a view bead of adhesive composition at the outset of the method used to measure sag of the adhesive composition.

"One or more" as used herein means that at least one or more than one, of the recited components may be used as disclosed. "Nominal" as used with respect to functionality means the theoretical functionality; generally this can be calculated from the stoichiometry of the ingredients used. Generally, the actual functionality is different due to imperfections in raw material, incomplete conversion of the reactants and formation of bi-products.

The one or more isocyanate functional polyether based prepolymers are present in sufficient quantity to provide adhesive character to the composition. Such prepolymers have an average isocyanate functionality sufficient to allow the preparation of a crosslinked polyurethane upon cure and not so high that the polymers are unstable. "Stability" in this context means that the prepolymer or adhesive prepared from the prepolymer has a shelf life of at least four months at ambient temperatures, in that it does not demonstrate an increase in viscosity during such period which prevents its application or use. For example, the viscosity should not rise too greatly to make it impractical to pump the adhesive composition. Preferably, the prepolymer or adhesive prepared therefrom does not undergo an increase in viscosity of more than about 50 percent during the stated period.

The prepolymer preferably has a free isocyanate content which facilitates acceptable strength in adhesives prepared from the prepolymers after 60 minutes and stability of the prepolymer. Preferably, the free isocyanate content is about 0.8 percent by weight or greater based on the weight of the prepolymer and more preferably about 0.9 percent by weight or greater, and preferably about 4.0 percent by weight or less, more preferably about 3.5 or less, even more preferably about 3.0 percent by weight or less, and even more preferably about 2.6 percent by weight or less. Above about 4.0 percent by weight, the adhesives prepared from the prepolymer may demonstrate lap shear strengths after 60 minutes that may be too low for the intended use. Below about 0.8 percent by weight, the prepolymer viscosity may be too high to handle and the working time may be too short.

The prepolymer preferably exhibits a viscosity, which facilitates formulation of a pumpable adhesive which has good green strength. Preferably, the viscosity of the prepolymer is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity used herein is Brookfield viscosity determined using a number 5 spindle. The viscosity of the adhesive can be adjusted with fillers, although the fillers generally do not improve the green strength of the final adhesive. Below about 1,000 centipoise (1 Pa s), the adhesive prepared from the prepolymer may exhibit poor green strength. Above about 100,000 centipoise (100 Pa s) the prepolymer may be unstable and hard to dispense.

Preferable polyisocyanates for use in preparing the prepolymer include those disclosed in U.S. Pat. No. 5,922,809 at col. 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols.

Polyether based prepolymers mean that the prepolymers are made from polyols such as diols and triols corresponding to the polyols described in U.S. Pat. No. 5,922,809 at column 4, line 60 to column 5, line 50, incorporated herein by reference. The polyols (diols and triols) are polyether polyols and more preferably polyoxyalkylene oxide polyols. The most preferred triols are ethylene oxide-capped polyols prepared by reacting glycerin with propylene oxide, followed by reacting the product with ethylene oxide. Preferably, the polyether is chosen to decrease the polarity of the prepolymer. A significant factor in determining the polarity of the prepolymer is the amount of ethylene oxide units in the polyether used to prepare the prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the polyether prepolymer such as a polyester polyol such as those known in the art. Typically, such other polyols may be present in an amount of about up to 5% by weight of the polyols used to make said prepolymer. However, said prepolymer may be made in the absence of such polyols.

The polyether based prepolymers of the invention have a molecular weight average between 10,000 to about 80,000 g/mole. The "molecular weight average" used herein is the z average molecular weight ($M_z$) molecular weight average as defined on page 206 of Textbook of Polymer Science $3^{rd}$ Edition, Billmeyer, F. W. Jr., John Wiley and Sons, NY, N.Y., 1984. Desirably, the Mz average is at least in ascending desirability: 20,000, 30,000, 40,000, 50,000 and 55,000 to at most about 70,000 or even at most about 65,000. Such Mz averages are necessary in combination with particular carbon blacks of this invention so that sag even after being sheared (e.g., pumped), recovers quickly so that sagging does not occur. To facilitate this sag behavior, surprisingly, it has been discovered that such recovery time and sag performance may be enhanced by heating the composition prior, during and even after being pumped, and applied to a substrate to be adhered to another substrate.

To achieve the sag and pumpability performance as described in the previous paragraph requires the combination of the aforementioned prepolymer with a carbon black having particular properties. The carbon blacks depending on their structure and the molecular weight of the prepolymers may range over a wide range of structures as given by oil absorption number (ASTM D-2414-09). For example, the carbon black typically should be an oil absorption number (OAN) of about 80 to 200 ccs per 100 grams, when the Mz of the prepolymer is about 65,000. Preferably, the oil absorption of the carbon is at least about 90, more preferably at least about 100, and most preferably at least about 110 to preferably at most about 180, more preferably at most about 165 and most preferably at most about 150 ccs/100 grams.

In addition the carbon black desirably has an iodine number that is at least 80. The iodine number is related to the surface area of the carbon black, but also to the presence of volatile species such as unsaturated oils and, sulfur containing compounds. The iodine number is determined using ASTM D1510-11.

Even though it is not understood, it has been discovered that even when the oil absorption number is lower than 80 cc/100 grams, one may achieve an adhesive composition that does not sag at room temperature so long as the iodine number is sufficiently high, but, it generally requires an excessive amount of carbon black such that the properties of the adhesive may be deleteriously affected. In a preferred embodiment, the product of the OAN and iodine number is generally at least 6,000. Preferably, the product of the OAN (cc/100 g) and iodine number (mg/g) is in rising preference at least 7,000; 8,000; 9,000; 10,000; 11,000; 12,000; 13,000 to at most practically obtainable such as 50,000.

The amount of carbon black suitable may be determined for a given carbon black and prepolymer Mz, by routine experimentation. Typically, the amount of carbon black is at least in ascending desirability, 10%, 15%, 18%, 23 or 25% to at most, in ascending desirability, 38%, 35%, 32%, 30% or 28% by weight of the adhesive composition.

The carbon black used in this invention may be a standard carbon black which is not specially treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include RAVEN™ 790, RAVEN™ 450, RAVEN™ 500, RAVEN™ 430, RAVEN™ 420 and RAVEN™ 410 carbon blacks available from Colombian and CSX carbon blacks available from Cabot, and PRINTEX™ 30 carbon black available from Evonik Industries, Mobile, Ala. Suitable non-conductive carbon blacks include RAVEN™ 1040 and RAVEN™ 1060 carbon black available from Colombian Chemicals Company, Marietta, Ga.

The adhesive composition of this invention also is comprised of reactive silicon. The reactive silicon may be present as a separate molecule such as a silane. It may be present within the backbone or as a terminal group in the prepolymer described above. The reactive silicon, generally is one that can undergo hydrolysis such as described at column 4, lines 25-55 of U.S. Pat. No. 6,613,816. Other illustrative reactive silicons may be found in U.S. Patent Publication 2002/0100550 paragraphs 0055 to 0065 and Hsieh, U.S. Pat. No. 6,015,475, column 5, line 27 to column 6, line 41, incorporated herein by reference.

The amount of reactive silicon present in the adhesive composition is, generally about 0.001% to 2% by weight of the total weight of the adhesive composition. The amount of the reactive silicon (note, the weight of the silicon itself and does not include, for example, the organic groups appended thereto), may be at least 0.005%, 0.01%, 0.02%, 0.04%, 0.06%, 0.08% or 0.1% to at most 1.8%, 1.6%, 1.4%, 1.2%, 1%, 0.8%, 0.5% of the adhesive composition.

Figure 2:
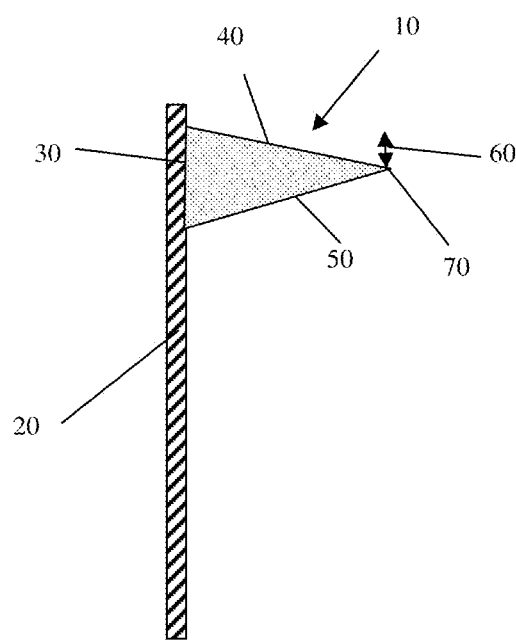
FIG. 2 is a view bead of adhesive after the adhesive composition has sagged in the method used to measure sag of the adhesive composition.

The adhesive composition as described previously displays excellent sag performance after being sheared by a pump and applied to a windshield. Sag is determined by shearing the adhesive composition at a shear of at least about 2,000 pascals and then applying a triangular shaped bead 10 to a vertical substrate 20 where the edge contacting the panel 30 is about 10 mm and the edge at a right angle 40 to the substrate 20 of about 25 mm, with the remaining edge 50 being about 27 mm as shown in FIG. 1. After about three minutes, the sag is determined by measuring the deflection 60 of the tip 70 from horizontal due to gravity as shown in FIG. 2. Sag of greater than about 5 mm is unacceptable for successful installation of a windshield into an automobile. Preferably, the sag is less than 4 mm, less than 3 mm, 2 mm, 1 mm or in essence no or zero sag. In another embodiment, the adhesive composition has sag that is greater at a temperature below ambient temperature than at temperatures higher than ambient even when the sag at ambient is 0 mm or at most 1 mm.

In one preferred embodiment, the prepolymer contains one or more organic based polymers dispersed therein. Preferably, the organic based polymer is included in the prepolymer by inclusion of a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Preferably, the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably, the triols used have a molecular weight of about 4,000 or greater, more preferably about 5,000 or greater and most preferably about 6,000 or greater. Preferably, such triol has molecular weight of about 8,000 or less and more preferably about 7,000 or less. It is understood that the polyol of the dispersion polyol (e.g., triol) is included in the polyol to make the prepolymer composition described herein, where the copolymer particles of the dispersion polyol are understood to be fillers in the composition.

Preferably, the particles dispersed in the dispersion triol comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably, the particles dispersed in the triol comprise copolymers of unsaturated nitriles, conjugated dienes and a monovinylidene aromatic monomer, a copolymer of an unsaturated nitrile and a monovinylidene aromatic monomer or a polyurea. Even more preferably, the particles comprise a polyurea or polystyrene-acrylonitrile copolymer with the polystyrene-acrylonitrile copolymers being most preferred. The organic polymer particles dispersed in the triol preferably have a particle size which is large enough to improve the impact properties and elastomeric properties of the finally cured adhesive, but not so large so as to reduce the ultimate strength of the adhesive after cure. The particles may be dispersed in the triol or grafted to the backbone of some of the triols. Preferably, the particle size is about 10 microns or greater and more preferably the particle size is about 20 microns or greater. Preferably, the particle size is about 50 microns or less and more preferably the particle size is about 40 microns or less. The triol dispersion contains a sufficient amount of organic polymer particles such that the adhesive upon cure has sufficient hardness for the desired use and not so much such that the cured adhesive has too much elasticity as defined by elongation. Preferably, the dispersion contains about 20 percent by weight or greater of organic polymer particles copolymer based on the dispersion, preferably about 30 percent by weight or greater and more preferably about 35 percent by weight or greater. Preferably, the dispersion contains about 60 percent by weight or less of organic polymer particles based on the dispersion, preferably about 50 percent by weight or less and more preferably about 45 percent by weight or less.

The polyols are present in an amount sufficient to react with most of the isocyanate groups of the isocyanates leaving enough isocyanate groups to correspond with the desired free isocyanate content of the prepolymer. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

Generally, the adhesive composition typically has a ratio of diols to triols and dispersion triols to achieve the desired cure rate and strength of the adhesive. The weight ratio of diol to triol and dispersion triol, if present, is preferably about 0.8 or greater and more preferably about 0.85 or greater and most preferably about 0.9 or greater. The weight ratio of diol to triol and dispersion triol, if present, is preferably about 3.0 or less; more preferably about 2.0 or less and most preferably about 1.75 or less. In the embodiment where the polyols comprise a mixture of diols and triols, the amount of diols present is preferably about 15 percent by weight or greater based on the prepolymer, more preferably about 25 percent by weight or greater and most preferably about 28 percent by weight or greater; and about 40 percent by weight or less based on the prepolymer, more preferably about 35 percent by weight or less and most preferably about 30 percent by weight or less. In the embodiment where the polyols comprise a mixture of diols and triols, the total amount of triols (non dispersion triol and dispersion triol) present is preferably about 15 percent by weight or greater based on the prepolymer, more preferably about 18 percent by weight or greater and most preferably about 20 percent by weight or greater; and preferably about 45 percent by weight or less based on the prepolymer, more preferably about 35 percent by weight or less and most preferably about 32 percent by weight or less.

The dispersion of organic polymer particles in a triol may be present in the prepolymer in an amount of about 10 percent by weight or greater of the prepolymer and more preferably about 12 percent by weight or greater, and about 18 percent by weight or less of the prepolymer and more preferably about 15 percent by weight or less.

The polyurethane prepolymers useful in the invention may further comprise a plasticizer. The plasticizers useful in the prepolymer are common plasticizers useful in polyurethane adhesive applications and well known to those skilled in the art and are referred hereinafter as low polar plasticizers. The plasticizer is present in an amount sufficient to disperse the prepolymer in the final adhesive composition. The plasticizer can be added to the adhesive either during preparation of the prepolymer or during compounding of the adhesive composition. Preferably, the plasticizer is present in about 1 percent by weight or greater of the prepolymer formulation (prepolymer plus plasticizer), more preferably about 20 percent by weight or greater and most preferably about 30 percent by weight or greater. Preferably, the plasticizer is present in about 45 percent by weight or less of the prepolymer formulation and more preferably about 35 percent by weight or less.

The prepolymer may be prepared by any suitable method, such as by reacting polyols, such as diols, triols and optionally dispersion triols such as a copolymer polyol or grafted triol, with an excess over stoichiometry of one or more polyisocyanates under reaction conditions sufficient to form a prepolymer having isocyanate functionality and free isocyanate content which meets the criteria discussed above. In a preferable method used to prepare the prepolymer, the polyisocyanates are reacted with one or more diols, one or more triols and, optionally, one or more dispersion triols. Preferable processes for the preparation of the prepolymers are disclosed in U.S. Pat. No. 5,922,809 at column 9, lines 4 to 51, incorporated herein by reference. The polyurethane prepolymers are present in the adhesive composition in an amount sufficient such that when the resulting adhesive cures, substrates are bound together. Preferably, the polyurethane prepolymers are present in an amount of about 20 parts by weight of the adhesive composition or greater, more preferably about 30 parts by weight or greater and most preferably about 35 parts by weight or greater. Preferably, the polyurethane prepolymers are present in an amount of about 60 parts by weight of the adhesive composition or less, more preferably about 50 parts by weight or less and even more preferably about 45 parts by weight or less.

The composition of the invention may further comprise a polyfunctional isocyanate, for example, may improve the modulus of the composition in the cured form or adhesion of the adhesion composition to particular substrates such as painted substrates. "Polyfunctional" as used in the context of the isocyanates refers to isocyanates having a functionality of 2 or greater. The polyisocyanates can be any monomeric, oligomeric or polymeric isocyanate having a nominal functionality of about 2.5 or greater. More preferably, the polyfunctional isocyanate has a nominal functionality of about 2.7 or greater. Preferably, the polyfunctional isocyanate has a nominal functionality of about 5 or less, even more preferably about 4.5 or less and most preferably about 3.5 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates, when present are typically present in an amount sufficient to impact the modulus of the cured compositions of the invention or improve the adhesion to certain substrates described above. The polyfunctional isocyanate, when present, is preferably present in an amount of about 0.5 parts by weight or greater based on the weight of the adhesive composition, more preferably about 1.0 parts by weight or greater and most preferably about 2 parts by weight or greater. The polyfunctional isocyanate is preferably present in an amount of about 8 parts by weight or less, based on the weight of the adhesive composition, more preferably about 5 parts by weight or less and most preferably about 4 parts by weight or less.

The adhesive also contains a catalyst which catalyzes the reaction of isocyanate moieties with water or an active hydrogen containing compound. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines. Mixtures of classes of catalysts may be used. A mixture of a tertiary amine and a metal salt is preferred. Even more preferred are tertiary amines, such as dimorpholino diethyl ether, and a metal alkanoate, such as bismuth octoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyltin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is present in an amount of about 60 parts per million or greater based on the weight of the adhesive, more preferably 120 parts by million or greater. The organotin catalyst is present in an amount of about 1.0 percent or less based on the weight of the adhesive, more preferably 0.5 percent by weight or less and most preferably 0.1 percent by weight or less.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)ether). Tertiary amines are preferably employed in an amount, based on the weight of the adhesive of about 0.01 parts by weight or greater, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

The compositions of this invention may further comprise plasticizers so as to modify the rheological properties to a desired consistency. Such materials should be free of water, inert to isocyanate groups and compatible with a polymer. The compositions of the invention preferably comprise two plasticizers with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, parraffinic oils and silicone oils. Preferred low polar plasticizers include alkyl phthalates, such as diisononyl phthalates, dioctylphthalate and dibutylphthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably, low polar plasticizers are used in the adhesive composition in an amount of about 5 parts by weight or greater based on the weight of the adhesive composition, more preferably about 10 parts by weight or greater, and most preferably about 18 parts by weight or greater. The low polar plasticizer is preferably used in an amount of about 40 parts by weight or less based on the total amount of the adhesive composition, more preferably about 30 parts by weight or less and most preferably about 25 parts by weight or less.

The amount of high polar plasticizer in the adhesive composition is that amount which gives the desired rheological properties and the acceptable sag and string properties. Preferably, the high polar plasticizers are used in the adhesive composition in an amount of about 0.2 parts by weight or greater based on the weight of the adhesive composition, more preferably about 0.5 parts by weight or greater, and most preferably about 1 part by weight or greater. The high polar plasticizer is preferably used in an amount of about 20 parts by weight or less based on the total amount of the adhesive composition, more preferably about 12 parts by weight or less and most preferably about 8 parts by weight or less.

The adhesive of the invention may be formulated with fillers other than the required carbon black and additives known in the prior art for use in adhesive compositions. By the addition of such materials, physical properties such as viscosity flow rates and the like can be modified. However, to prevent premature hydrolysis of the moisture sensitive groups of the polyurethane prepolymer, fillers should be thoroughly dried before admixture therewith.

Optional components of the adhesive of the invention include reinforcing fillers. Such fillers may include those known in the art and including, for example, titanium dioxide, calcium carbonate, surface treated silicas, titanium oxide, fumed silica, talc, and the like. In one embodiment, more than one reinforcing filler may be used. The reinforcing fillers are typically used in an amount sufficient to increase the strength of the adhesive.

Among optional filler materials in the adhesive composition are clays. Preferred clays useful in the invention include kaolin, surface treated kaolin, calcined kaolin, aluminum silicates and surface treated anhydrous aluminum silicates. The clays can be used in any form, which facilitates formulation of a pumpable adhesive. Preferably, the clay is in the form of pulverized powder, spray-dried beads or finely ground particles. Clays may be used in an amount of about 0.1 parts by weight of the adhesive composition or greater, more preferably about 12 parts by weight or greater and even more preferably about 18 parts by weight or greater. Preferably, the clays are used in an amount of about 30 parts by weight or less of the adhesive composition, more preferably about 28 parts by weight or less and most preferably about 24 parts by weight or less.

The composition of this invention may further comprise stabilizers, which function to protect the adhesive composition from moisture, thereby inhibiting advancement and preventing premature crosslinking of the isocyanates in the adhesive composition. Stabilizers known to the skilled artisan for moisture curing adhesives may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrolidinones such as 1 methyl-2-pyrolidinone, available from under the trademark M-PYROL. The hydrophilic material is preferably present in an amount of about 0.1 parts by weight or greater and more preferably about 0.3 parts by weight or greater and preferably about 1.0 parts by weight or less and most preferably about 0.6 parts by weight or less. Optionally, the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of a composition in a sufficient amount to give the desired rheological properties. Preferably, the thixotrope is present in an amount of about 0.01 parts by weight or greater based on the weight of the adhesive composition, preferably about 1 part by weight or greater. Preferably, the optional thixotrope is present in an amount of about 10 parts by weight or less based on the weight of the adhesive composition and more preferably about 2 parts by weight or less.

Other components commonly used in adhesive compositions may be used in the composition of this invention. Such materials include those known in the art and may include ultraviolet stabilizers and antioxidants and the like.

As used herein, all parts by weight relative to the components of the adhesive composition are based on 100 total parts by weight of the adhesive composition.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments where a polyester based isocyanate functional prepolymer is used, the adhesive compositions are blended at a temperature above the melting point of the polyester based isocyanate functional prepolymer and below a temperature at which significant side reactions occur. In this embodiment, the temperatures utilized are from about 40° C. to less than about 90° C. and more preferably about 50° C. to about 70° C. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos. 4,525,511; 3,707,521 and 3,779,794; relevant parts of all are incorporated herein by reference. Generally, the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably, the adhesive of the invention is formulated to provide a working time of about 6 minutes or greater, and more preferably about 12 minutes or greater. Preferably, the working time is about 60 minutes or less and more preferably about 30 minutes or less.

The adhesive composition is preferably used to bond glass or plastic coated with an abrasion resistant coating, to other substrates such as bare or painted metals or plastics. In a preferred embodiment, the first substrate is a glass, or plastic coated with an abrasion resistant coating, and the second substrate is a window frame. In another preferred embodiment, the first substrate is a glass, or plastic coated with an abrasion resistant coating, and the second substrate is a window frame of an automobile. Preferably, the glass window is cleaned and has a glass primer applied to the area to which the adhesive is to be bonded. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

In another embodiment, the compositions of the invention can be used to bond modular components together. Examples of modular components include vehicle modules, such as door, window or body.

"Viscosities" as described herein are determined according to the procedure disclosed in Bhat, U.S. Pat. No. 5,922,809 at column 12, lines 38 to 49, incorporated herein by reference. "Molecular weights" as described herein are determined according to the following to the procedure disclosed in Bhat, U.S. Pat. No. 5,922,809 at column 12, lines 50 to 64, incorporated herein by reference. In reference to polyurethane prepolymers, average isocyanate functionality is determined according to the procedure disclosed in Bhat, U.S. Pat. No. 5,922,809 at column 12, lines 65 to column 13, line 26, incorporated herein by reference.

Illustrative Embodiments of the Invention

The following examples are provided to illustrate the invention, but are not intended to limit the scope thereof. All parts and percentages are by weight unless otherwise indicated.

Example 1

Prepolymer Mixture Preparation

A polyether polyurethane prepolymer was prepared by mixing the following reactants at 48° C.: 28.16 parts by weight (pbw) of a polyoxypropylene having an ethylene oxide end cap and a weight average molecular weight of 2,000 with 21.14 pbw of a polyoxypropylene triol having a weight average molecular weight of 4500 with 8.88 pbw of dipheylmethane-4,4'-diisocyanate and 0.005 pbw stannous octoate. After all the reactants were mixed, this mixture was then reacted for 1 hour at about 65° C. to form the polyether prepolymer.

After the polyether prepolymer was formed, 33.92 pbw of diisononyl phthalate plasticizer was added to the mixture and then mixed for about 0.5 hour. Thereafter, 1.27 pbw of *gamma-amino propyl trimethoxysilane, and 0.85 pbw of diethyl malonate were added to the mixture and mixed for 30 minutes. Finally, 5.78 ppw of an aliphatic polyisocyanate (HDI trimer) DESMODUR™ N-3300, available from Bayer Material Science AG, Leverkusen, Germany, was added with mixing to form a prepolymer mixture. The aliphatic polyisocyanate had an NCO content of about 21.8%, viscosity of about 3000 mPa·s.

Intermediate Mixture

An intermediate mixture for use in making the adhesive composition was pre-made by mixing 48.4 pbw of N-methyl pyrolidone, 48.24 pbw of morpholine, 4-4' (Oxydi-2-1-ethanediyl) (JEFFCAT™ DMDEE), and 3.36 pbw dimethyltin di-neodecanoate (85%) for 15 minutes.

Adhesive Preparation:

67.63% w/w of the prepolymer mixture was charged to a vessel and degassed under vacuum for 15 minutes. 27.5% w/w of ELFTEX™ S7100 carbon black (Cabot Corp., Boston Mass.) was added and mixed for five minutes at slow speed under vacuum. The mixing speed was increased and the carbon black dispersed for 20 minutes. Then 0.6 pbw of the intermediate mixture and 0.6 pbw of tris-nonylphenyl phosphite, and 3.67 pbw of diisononyl phthalate were added and mixed for 30 minutes more to make the adhesive composition.

The adhesive composition of this Example has an Mz of 65,379 g/mole and a sag of 0 mm tested as described herein. The sag was also tested without shearing prior to application other than the shear encountered by application of the triangular bead and again the sag was 0 mm. Finally, the sag performance was tested by cooling the adhesive composition to negative four degrees Celsius (−4° C.) prior to applying the triangular bead. At this low temperature, the sag was greater than 25 mm.

Example 2

In this Example, the adhesive composition of Example 1 was placed in a sealed aluminum tube and heated to 54° C. and held at that temperature for 5 days to increase the Mz to 73,596 g/mole. This Example had a sag of 3.8 mm at ambient temperature (~23° C.). Upon heating to 33° C. prior to forming the triangular bead to perform the sag test, the sag was less than about 1 mm. Upon cooling to a temperature of 12° C. prior to application of the triangular bead, the sag was greater than about 25 mm.

Example 3

In this Example, the adhesive composition of Example 1 was placed in a sealed aluminum tube and heated to 54° C. and held at that temperature for 7 days to increase the Mz to 77,747 g/mole. This Example had a sag of 15 mm at ambient temperature (~23° C.).

Comparative Example 4

In this Example, the adhesive composition of Example 1 was placed in a sealed aluminum tube and heated to 54° C. and held at that temperature for 9 days to increase the Mz to 84,754 g/mole. This Example had a sag of about 25 mm at ambient temperature (~23° C.).

The above Examples and this Comparative Example, show that the adhesive composition of this invention surprisingly has improved sag at elevated temperatures above ambient temperature (~23° C.). In contrast, when the Mz exceeds about 80,000 g/mole, the ability of the adhesive to have low sag was not possible at a reasonable elevated temperature for application of the adhesive. Further, the Examples describe the method of the invention where by the adhesive is heated sometime prior to application to improve the sag performance of the composition.

Examples 4-10 and Comparative Example 5

In these examples, a prepolymer was made in the same way as in Example 1 such that the Mz of the prepolymer is as shown in Table 1. To achieve the Mz, the amount of momomeric diphenylmethane-4,4'-diisocyanate (MDI) used was 10.92 pbw. The adhesive composition was also made in the same way as in Example 1 except that the carbon black that was used and the amount used was as shown in Table 1. Example 9 showed that even though the oil absorption number (OAN) drops below 80, the adhesive may be able to be made without sagging at room temperature, but this is not preferred due to the large amounts of carbon black that may be required. Likewise, when the iodine number is below about 80 and the OAN is above 80 it may be possible to make an adhesive composition without sagging at ambient temperature, but again this generally requires excess amounts of carbon that can deleteriously affect the properties of the adhesive composition.

Comparative Example 5 was not able to be formed into a usable adhesive that did not sag.

12.05 pbw. The Mz of the prepolymer was 34,399 g/mol. This adhesive displayed no sag at room temperature. Comparative Examples 6 and 7 show that the Mz of the prepolymer in the absence of reactive silicon within the adhesive composition fails to display any significant impact on the sag of the adhesive over a large range of prepolymer molecular weights (Mz).

Comparative Example 8

This Comparative Example's adhesive composition was made in the same way as in Example 1, except that the amount of MDI used was 7.97 pbw and the prepolymer had an Mz of 129,739. The adhesive composition of this Comparative Example did not sag at room temperature.

Comparative Example 9

In this Comparative Example, the adhesive composition of Comparative Example 8 was heat aged for 3 days at 65° C. The Mz was not measured. The sag at room temperature was 22 mm and was not suitable as an adhesive.

The above Examples, (1, 2, and 3) and Comparative Examples 8 and 9, show that the Mz may be initially a bit higher than 80,000, but at these Mz's, they become rapidly unusable due to aging and as such not a practical product. It is not understood why this is so, and in no way limiting the

| Example | Carbon Black* | % Carbon Black in Adhesive Composition | Oil absorption number (cc/100 g) | Iodine number (mg/g) | Oil absorption number × Iodine number | Pre-polymer MZ | Sag (mm) @ room temperature |
|---|---|---|---|---|---|---|---|
| 4 | Elftex ™ S7100 | 28.2 | 117 | 185 | 21645 | 33600 | 0 |
| 5 | Monarch ™ 580 | 27.7 | 120 | 122 | 14640 | 33600 | 0 |
| 6 | Monarch ™ 570 | 28.2 | 114 | 121 | 13794 | 33600 | 0 |
| 7 | Monarch ™ 490 | 28.2 | 122 | 90 | 10980 | 33600 | 0 |
| 8 | Printex ™ 30 | 31 | 105 | 90 | 9450 | 33600 | 0 |
| 9 | Regal ™ 660R | 35 | 65 | 121 | 7865 | 33600 | 0 |
| 10 | Monarch ™ 280 | 27.3 | 134 | 45 | 6030 | 33600 | 0 |
| Comparative 5 | Monarch ™ 120 | 35 | 70 | 30 | 2100 | 33600 | flowed |

*All the Carbon blacks were from Cabot Corporation, Boston, MA except Printex 30.
*Printex 30 was from Evonics Industries, Mobile, AL.

Comparative Example 6

In this Comparative Example, the prepolymer was made in the absence of a reactive silicon (i.e., the *gamma-amino propyl trimethoxysilane) and the prepolymer was made as follows. The following reactants were mixed at 48° C.: 22.73 parts by weight (pbw) of a polyoxypropylene having an ethylene oxide end cap and a weight average molecular weight of 2,000 with 32.94 pbw of a polyoxypropylene triol having a weight average molecular weight of 4500 with 10.04 pbw of dipheylmethane-4,4'-diisocyanate and 0.005 pbw stannous octoate. After all the reactants were mixed, the mixture was reacted for 1 hour at about 65° C. to form the polyether prepolymer. Immediately after the polyether prepolymer was formed, 33.325 pbw of a diisononyl phthalate plasticizer and 0.96 pbw of diethyl malonate were added to the mixture and mixed for 30 minutes. The Mz of this prepolymer was about 315,578 g/mol. This Comparative Example displayed no sag. The intermediate and adhesive composition were formed in the same way as described in Example 1.

Comparative Example 7

This Comparative Example was made in the same way as in Comparative Example 6 except that the amount of MDI was invention, it is believed that there are complex interactions involving the reactive silicon and the molecular weight that occur over time when the adhesive composition is aged. Nevertheless, when the Mz is below about 80,000, the adhesive shows good performance even when aged for substantial times (e.g., 6 months, 9 months, 12 months or even 18 months).

What is claimed is:

1. An adhesive composition comprising: a) an isocyanate functional polyether base prepolymers having a z molecular weight average (Mz) of about 10,000 to about 80,000 g/mole; (b) a carbon black having an average oil absorption number of at least about 80 to at most about 400 cubic centimeters of dibutyl phthalate per 100 grams of the carbon black; (c) reactive silicon in an amount from about 0.001% to about 10% by weight of the adhesive composition; and (d) one or more catalysts for the reaction of isocyanate with hydroxyl groups.

2. The adhesive composition of claim 1 wherein the adhesive composition has a sag of less than 5 mm.

3. The adhesive composition of claim 2 wherein the adhesive composition has a sag of greater than 5 mm at ambient temperatures and a sag of less than 5 mm at temperatures greater than ambient.

4. The adhesive composition of claim 3 wherein the carbon black has an oil absorption of about 100 to about 150.

5. The adhesive composition of claim 4 wherein the adhesive composition has less than 5 mm of sag at ambient temperature and the z molecular weight average of the isocyanate functional polyether base prepolymer is at most 70,000 g/mole.

6. The adhesive composition of claim 5 further comprising a high polar plasticizer and low polar plasticizer, wherein the high polar plasticizer is one or more alkyl esters of sulfonic acid and the low polar plasticizer is one or more aromatic diesters.

7. The adhesive composition of claim 6 wherein the isocyanate functional polyether base prepolymers has a free isocyanate content from about 0.8% to about 4% by weight.

8. The adhesive composition of claim 1 wherein the composition further comprises one or more polyisocyanates having a nominal functionality of about 2 or greater.

9. The adhesive composition of claim 8 wherein the polyfunctional polyisocyanate is an oligomer or polymer based on hexamethylene diisocyanate or methylene diphenyl diisocyanate.

10. The adhesive composition of claim 1, wherein the carbon black has an iodine number of at least 80 mg/g of carbon black.

11. The adhesive composition of claim 10, wherein the product of the oil absorption and iodine number of the carbon black is at least 7,000.

12. The adhesive composition of claim 1, wherein the adhesive composition is further comprised of a clay filler.

13. The adhesive composition of claim 1, wherein the product of the oil absorption and iodine number of the carbon black is at least 9,000.

14. The adhesive composition of claim 1, wherein the carbon black is present in the adhesive composition in an amount of at least about 18% by weight of the adhesive composition.

15. The adhesive composition of claim 2, wherein the sag is greater at a temperature below ambient temperature that at temperatures higher than ambient and the sag at ambient temperatures is 0 mm to at most 1 mm.

16. The adhesive composition of claim 3 wherein the carbon black is present in an amount of about 20 parts by weight or more of the adhesive composition.

17. The adhesive composition of claim 3 wherein the carbon black is present in an amount of at least about 23 parts by weight of the adhesive composition.

18. The adhesive composition of claim 3 wherein the adhesive has a sag that is greater at a temperature below ambient temperature than at temperature above ambient temperatures.

19. The adhesive composition of claim 18, wherein the adhesive composition has a sag of 0 to 1 mm at 23° C.

* * * * *